(12) United States Patent
Haro Gonzalez et al.

(10) Patent No.: US 10,682,702 B2
(45) Date of Patent: Jun. 16, 2020

(54) REUTILIZATION OF ADDITIVE MANUFACTURING SUPPORTING PLATFORMS

(71) Applicant: General Electric Company, Schenectady, NY (US)

(72) Inventors: Juan Vicente Haro Gonzalez, Zurich (CH); Jan Vladimir Schwerdtfeger, Birr (CH)

(73) Assignee: General Electric Company, Schenectady, NY (US)

(*) Notice: Subject to any disclaimer, the term of this patent is extended or adjusted under 35 U.S.C. 154(b) by 339 days.

(21) Appl. No.: 15/420,494

(22) Filed: Jan. 31, 2017

(65) Prior Publication Data

US 2018/0214947 A1   Aug. 2, 2018

(51) Int. Cl.
| | |
|---|---|
| *B22F 3/105* | (2006.01) |
| *B29C 64/153* | (2017.01) |
| *B29C 64/40* | (2017.01) |
| *B33Y 10/00* | (2015.01) |
| *B33Y 30/00* | (2015.01) |
| *B23H 7/02* | (2006.01) |
| *B22F 3/24* | (2006.01) |

(52) U.S. Cl.
CPC .......... *B22F 3/1055* (2013.01); *B29C 64/153* (2017.08); *B29C 64/40* (2017.08); *B22F 2003/1058* (2013.01); *B22F 2003/247* (2013.01); *B22F 2998/10* (2013.01); *B23H 7/02* (2013.01); *B33Y 10/00* (2014.12); *B33Y 30/00* (2014.12); *Y02P 10/295* (2015.11)

(58) Field of Classification Search
CPC .............................. B33Y 10/00; B22F 3/1055

USPC ........................................................ 419/1
See application file for complete search history.

(56) References Cited

U.S. PATENT DOCUMENTS

| | | | |
|---|---|---|---|
| 6,042,774 A | 3/2000 | Wilkening et al. | |
| 2009/0202378 A1 | 8/2009 | Illston | |
| 2015/0056321 A1 | 2/2015 | Zhang et al. | |
| 2018/0194070 A1* | 7/2018 | Dikovsky | B29C 64/40 |

FOREIGN PATENT DOCUMENTS

| | | |
|---|---|---|
| DE | 102012011217 A1 | 12/2013 |
| WO | 2013017144 A1 | 7/2013 |

* cited by examiner

*Primary Examiner* — Weiping Zhu
(74) *Attorney, Agent, or Firm* — Hoffman Warnick LLC

(57) ABSTRACT

A method for using a build plate including a reusable supporting platform for additive manufacturing of a component is disclosed. The method may include additive manufacturing the reusable supporting platform on a top surface of a base of the build plate, and additive manufacturing a first component on the second surface of the reusable supporting platform. The method may also include separating the first component from the build plate at the second surface of the reusable supporting platform, thereby exposing a new surface of the body of the reusable supporting platform. Additionally, the method may include additive manufacturing at least a second component on the new surface of the reusable supporting platform. The reusable supporting platform may include a body including a first surface coupled to the top surface of the base of the build plate, and a second surface configured to support a component to be formed by additive manufacturing and for separation of the component from the build plate.

20 Claims, 12 Drawing Sheets

REUTILIZATION OF ADDITIVE MANUFACTURING SUPPORTING PLATFORMS

BACKGROUND OF THE INVENTION

The present disclosure generally relates to methods for additive manufacturing (AM) that utilize supports in the process of building a component, as well as reusable supporting platforms utilized within AM processes.

Components or parts for various machines and mechanical systems may be built using AM systems. AM systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes on stock material.

Conventional additive manufacturing systems build these components on large, solid build plates. These conventional build plates are often made of one to two inches of solid metal, for example stainless steel. It is also conventional to AM disposable supports on the build plate upon which the component may be formed. The disposable supports provide separation of the component from the build plate and are entirely sacrificed and/or removed during removal of the component from the build plate, simplifying removal. Once removed, the disposable supports may not be reused by the build plates and may be discarded or scrapped. With increasing component complexity and more demanding alloys, the supports are also known to include structures for various secondary functions. For example, the supports may include structures or a surface to prevent dislocation of the component from the supports during additive manufacturing of the component. Aside from being heavy, cumbersome and expensive to initially manufacture, additional costs are typically associated with the use of conventional build plates and supports by the additive manufacturing systems. For example, after a component is built on and removed from the conventional build plate by entirely sacrificing the disposable supports, the build plate must undergo additional processing, and the supports must be rebuilt. First, the build plate, including the remnants of the supports, must be machined (e.g., resurfaced, planed, milled and the like) before being utilized again by the additive manufacturing system to build another set of supports and another component. The required machining after every component build is expensive and typically requires the build plate to be sent away, which can affect the production time of components when only one or a few build plates are accessible to be used by the additive manufacturing system. Additionally, every time the build plate is machined, the operational life of the build plate is decreased, and the build plate will eventually need to be replaced. Second, the supports must be rebuilt, which further affects the production time of components and increases the cost of producing the components, especially where the supports include complex structures or geometries with secondary functions.

BRIEF DESCRIPTION OF THE INVENTION

A first aspect of the disclosure provides a method for using a reusable supporting platform for additive manufacturing, the method including: additive manufacturing the reusable supporting platform on a top surface of a build plate, the reusable supporting platform including: a body including a first surface coupled to the top surface of the build plate, and a second surface configured to support a component to be formed by additive manufacturing and for separation of the component from the build plate; additive manufacturing a first component on the second surface of the reusable supporting platform; separating the first component from the build plate at the second surface of the reusable supporting platform, thereby exposing a new surface of the body of the reusable supporting platform; and additive manufacturing a second component on the new surface of the reusable supporting platform.

A second aspect of the disclosure provides a method for manufacturing a build for additive manufacturing, the method including: forming a base of the build plate; and additive manufacturing a reusable supporting platform on a top surface of the base plate, the reusable supporting platform including: a body including a first surface coupled to the top surface of the build plate, and a second surface configured to support a component to be formed by additive manufacturing using the build plate and for separation of the component from the build plate.

A third aspect of the disclosure provides a build plate for additive manufacturing including: a base of the build plate including a top surface; a reusable supporting platform on the top surface formed by additive manufacturing including a body including a first surface coupled to the top surface of the base plate, and a second surface configured to support a component to be formed by additive manufacturing using the build plate and for separation of the component from the build plate.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to additive manufacturing systems, and more particularly to a build plate including a reusable supporting platform utilized by an additive manufacturing system to build components. As indicated above, the disclosure provides a method for using a build plate including a reusable supporting platform for additive manufacturing of a component, and in particular, a metallic component formed using metal powder additive manufacturing. A method for manufacturing a build plate including a reusable supporting platform is also described. A build plate including a reusable supporting platform is also described.

These and other embodiments are discussed below with reference to FIGS. 1-12. However, those skilled in the art will readily appreciate that the detailed description given herein with respect to these Figures is for explanatory purposes only and should not be construed as limiting.

Figure 1:
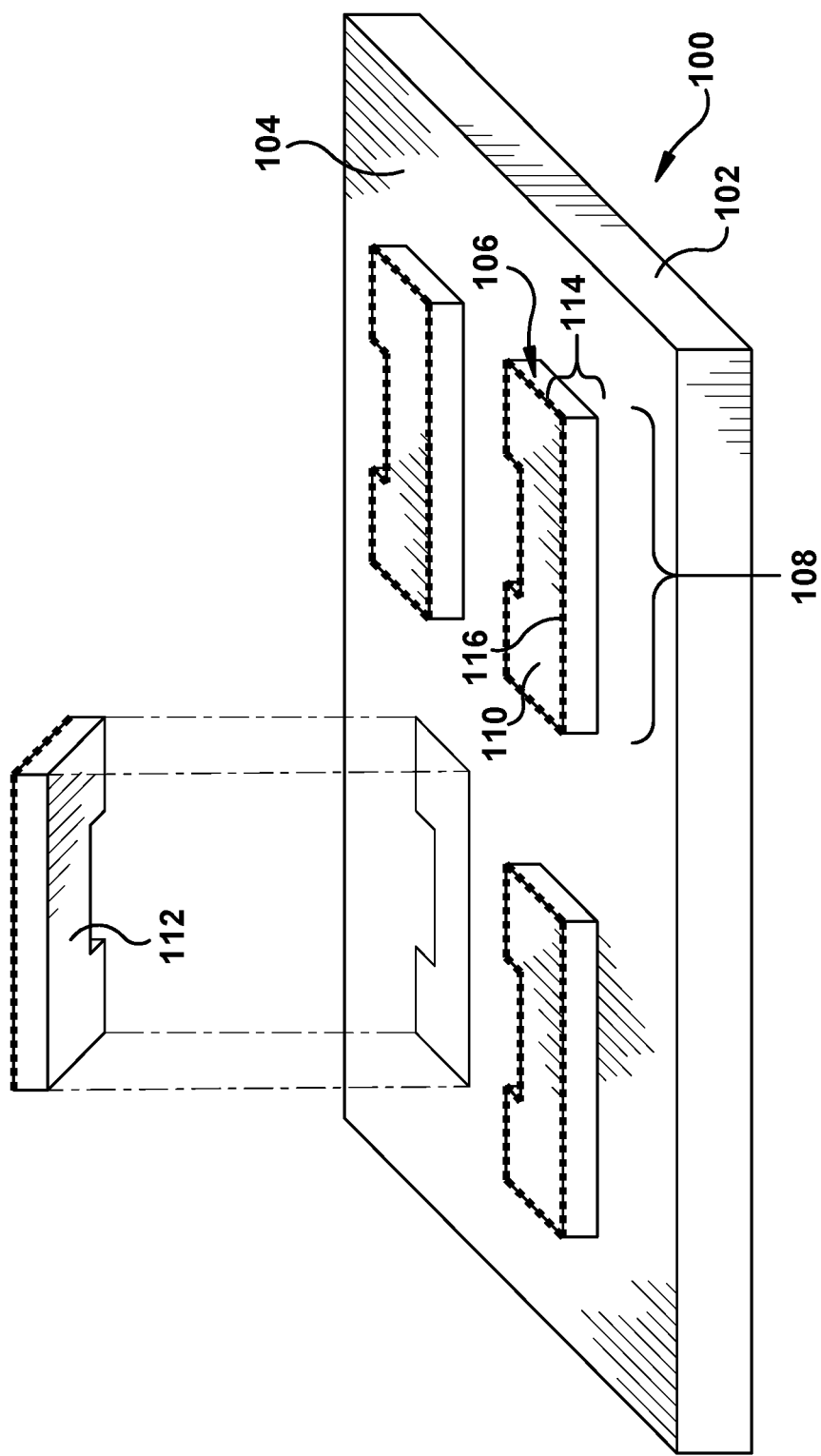
FIG. 1 shows a perspective view of a build plate including reusable supporting platforms for additive manufacturing of an illustrative component according to embodiments of the disclosure.
Figure 2:
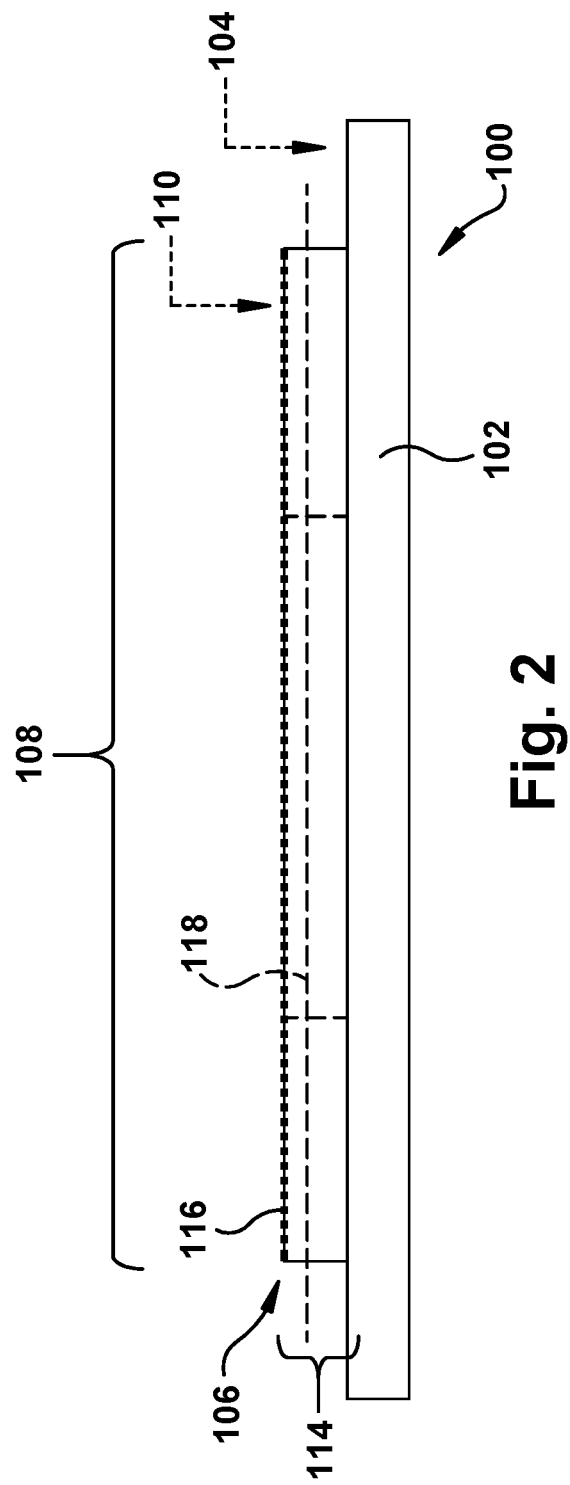
FIG. 2 shows an enlarged side view of a portion of the build plate FIG. 1 for additive manufacturing of an illustrative component according to embodiments of the disclosure.

FIGS. 1-2 show illustrative views of a build plate including reusable supporting platforms for additive manufacturing of a component formed by additive manufacturing. Specifically in the non-limiting example of FIG. 1, three reusable supporting platforms 106 are shown formed on top surface 104, and one is shown exploded away for illustrative purposes. Additionally, FIG. 2 shows a side view of the build plate and one reusable supporting platform.

Build plate 100 includes base 102 having an exposed top surface 104. When positioned within and or utilized by AM, top surface 104 may be exposed. Build plate 100 may be formed from any substantially rigid material that may be machined and/or processed to form build plate 100. In non-limiting examples, build plate 100 may be formed from metal, metal alloys, polymers, ceramics, composites and any other material having substantially similar physical properties.

As shown in FIGS. 1 and 2, build plate 100 also includes at least one reusable supporting platform 106 extending from top surface 104 of base 102. Reusable supporting platform 106 includes body 108 including top surface 110 (see, FIG. 1), bottom surface 112 (see, FIG. 1) and height 114. Reusable supporting platform 106 extends vertically from base 102. Top surface 110 may be exposed to support a component formed by additive manufacturing, as discussed herein. Bottom surface 112 may be vertically opposed to top surface 110. In the example, bottom surface 112 may be integrally formed on top surface 104 of base 102 during additive manufacturing. In other non-limiting examples, bottom surface 112 of reusable supporting platform 106 may be coupled to top surface 104 of base 102 by sintering, brazing, mechanical fastening, releasable coupling and/or any other suitable joining or coupling technique and/or coupling component. Height 114 extends from bottom surface 112 to top surface 110. In a non-limiting example, height 114 may be approximately 1 millimeter to approximately 5 millimeters. It is understood that height 114 may include any height sufficient to support additive manufacturing of a component formed by additive manufacturing and include desired structures in body 108. It is emphasized that build plate 100 including reusable supporting platform 106 may be reutilized to produce any number of components by additive manufacturing.

In a non-limiting example, reusable supporting platform 106 may also include set of markers 116. In the non-limiting example of FIG. 2, markers 116 may be formed adjacent to top surface 110 of reusable supporting platform 106. In a second non-limiting example, markers 116 may be positioned at alternative location 118 positioned between top surface 110 and bottom surface 112. In a third non-limiting example, markers 116 may be located anywhere between top surface 110 and bottom surface 112 so long as at least a portion of reusable supporting platform 106 remains after the removal process as discussed herein. Although illustrated in FIG. 1 in a specific quantity surrounding reusable supporting platform 106 at top surface 110, markers 116 may be included in any number. In a non-limiting example, markers 116 may be formed by additive manufacturing during formation of reusable supporting platform 106. Markers 116 may include in a non-limiting example, at least one gap, indentation and/or reduction of material of reusable supporting platform 106 in a predetermined area or location (e.g., adjacent top surface 110, alternative location 118, between top surface 110 and bottom surface 112). Markers 116 are configured for guidance during removal of a component formed by additive manufacturing from reusable supporting platform 106. Additionally, markers 116, and specifically the gaps, indentations and/or reduction of material of reusable supporting platform 106, may aid and/or ease the removal of a component formed on reusable supporting platform 106, as discussed herein.

Figure 3:
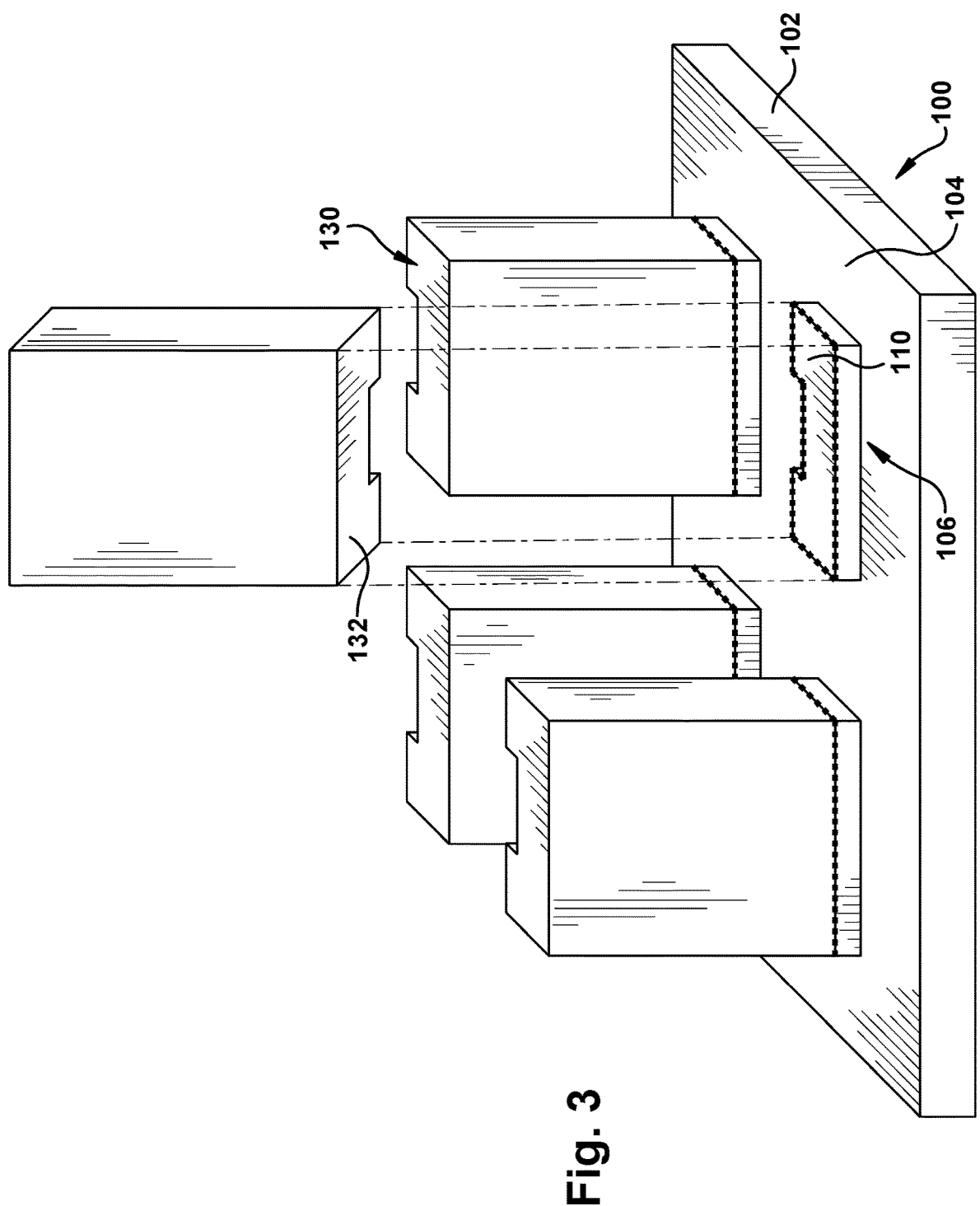
FIG. 3 shows a perspective view of the build plate of FIG. 1 including an illustrative component additively manufactured on the build plate according to embodiments of the disclosure.

In the non-limiting examples of FIGS. 1 and 2, reusable supporting platform 106 is illustrated as a solid, u-shape configured to support illustrative component (see, FIG. 3). As discussed herein, reusable supporting platform 106 may include any geometry and size for supporting any component formed by additive manufacturing. It is also understood that body 108 of reusable supporting platform 106 may include structures for additional functions, for example, for preventing dislocation of an additive manufactured component from reusable supporting platform 106 during formation of the component.

Reusable supporting platform 106 may be formed from any material capable of use in an additive manufacturing process. In one non-limiting example, reusable supporting platform 106 may be formed from the same material as base 102 and/or the component to be formed thereon. In another non-limiting example, reusable supporting platform 106 may be formed from a material different from the material used to form base 102 and/or the component to be formed thereon. In non-limiting examples, reusable supporting platform 106 may be formed from metal, metal alloys, polymers, ceramics, composites and any other material having substantially similar physical properties.

Although four reusable supporting platforms 106 are depicted in FIG. 1, it is understood that this number is merely exemplary, and build plate 100 may include more or less reusable supporting platform 106. Additionally, although reusable supporting platform 106 is depicted in specific locations on top surface 104 of base 102, it is understood that reusable supporting platform 106 may be positioned at any desirable location on top surface 104.

FIG. 3 shows a perspective view of build plate 100 with at least one illustrative component 130 formed thereon. Specifically in the non-limiting example, three components 130 are shown formed on reusable supporting platforms 106, and one is shown exploded away for illustrative purposes. As shown in FIG. 3, illustrative component 130 includes bottom surface 132. As shown, in a non-limiting example, bottom surface 132 of illustrative component 130 may be integrally formed on top surface 110 of reusable supporting platform 106 by additive manufacturing. Formation of illustrative component 130 may for example also include alignment of additive manufacturing bottom surface 132 of illustrative component 130 with top surface 110 of reusable supporting platform 106.

Illustrative component 130 may include any component formed by an additive manufacturing process. Illustrative component 130 may for example be formed by an individual additive manufacturing process, separate from the formation of reusable supporting platform 106 by additive manufacturing. In another non-limiting example, illustrative component 130 may be formed during the same, continuous additive manufacturing process as the formation of reusable supporting platform 106 on base 102 of build plate 100. In the example of FIG. 3, the geometry and size of bottom surface 132 of illustrative component 130 corresponds to the geometry and size of top surface 110 of reusable supporting platform 106. As discussed herein, bottom surface 132 may include any size approximately equal to or approximately smaller than top surface 110 of reusable supporting platform 106 and any geometry desirable for illustrative component 130.

Illustrative component 130 may be formed from any material capable of use in an additive manufacturing process. In one non-limiting example, illustrative component 130 may be formed from the same material as reusable supporting platform 106 and/or base 102 of build plate 100. In another non-limiting example, illustrative component 130 may be formed from a material different from the material used to form reusable supporting platform 106 and/or base 102 of build plate 100. In non-limiting examples, illustrative component 130 may be formed from metal, metal alloys, polymers, ceramics, composites and any other material having substantially similar physical properties.

In one non-limiting example, the number of components 130 may be dependent on the number of reusable supporting platforms 106. In another non-limiting example, the number of components 130 may not be dependent on the number of reusable supporting platforms 106 and can be formed directly on top surface 104 of build plate 100. In another non-limiting example, the number of components 130 may not be dependent on the number of reusable supporting platforms 106 and can be formed in any quantity on a single reusable supporting platform 106.

Figure 4:
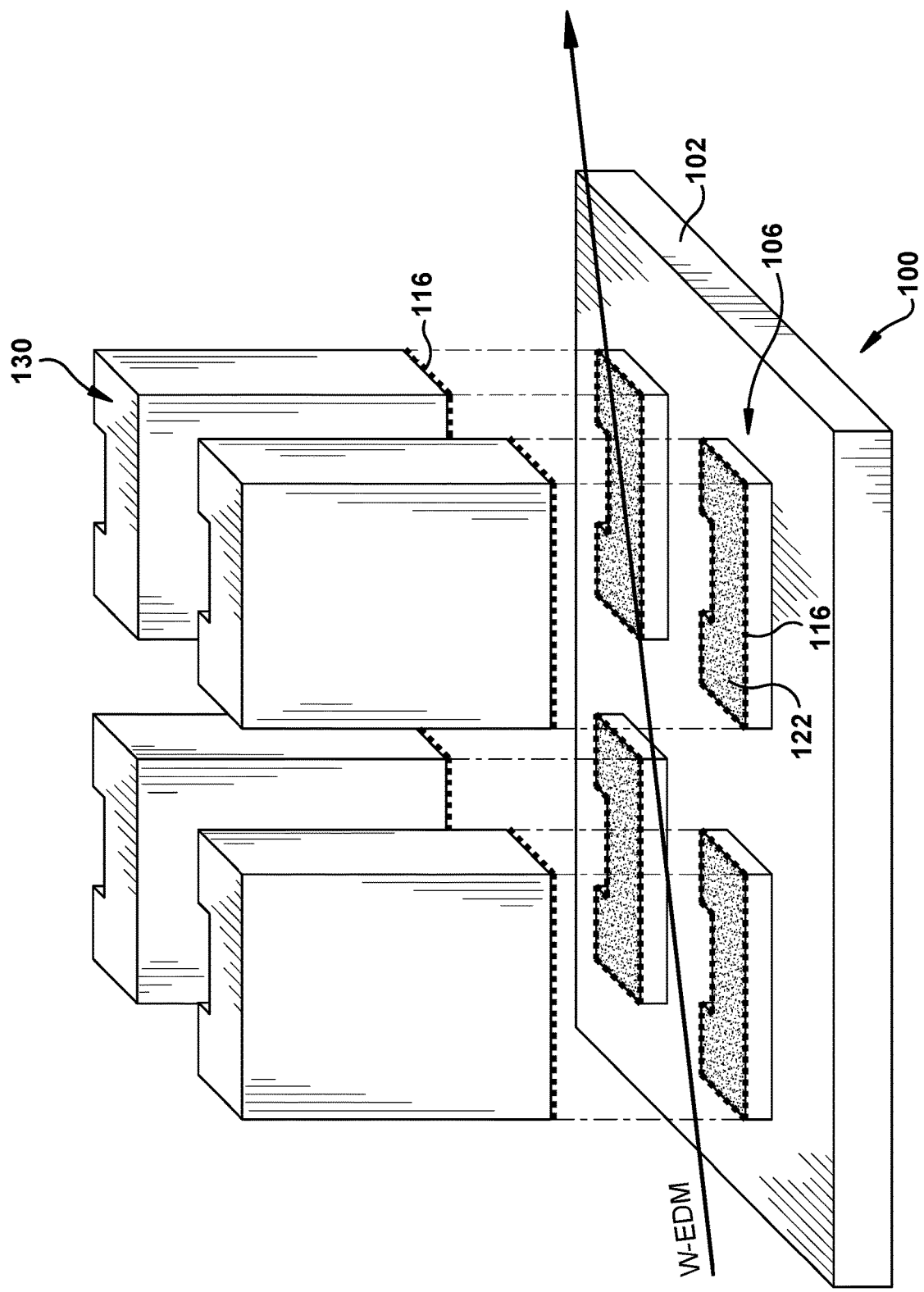
FIG. 4 shows a perspective view of the build plate and illustrative component of FIG. 3 illustrating the removal of the illustrative component from the build plate according to embodiments of the disclosure.
Figure 5:
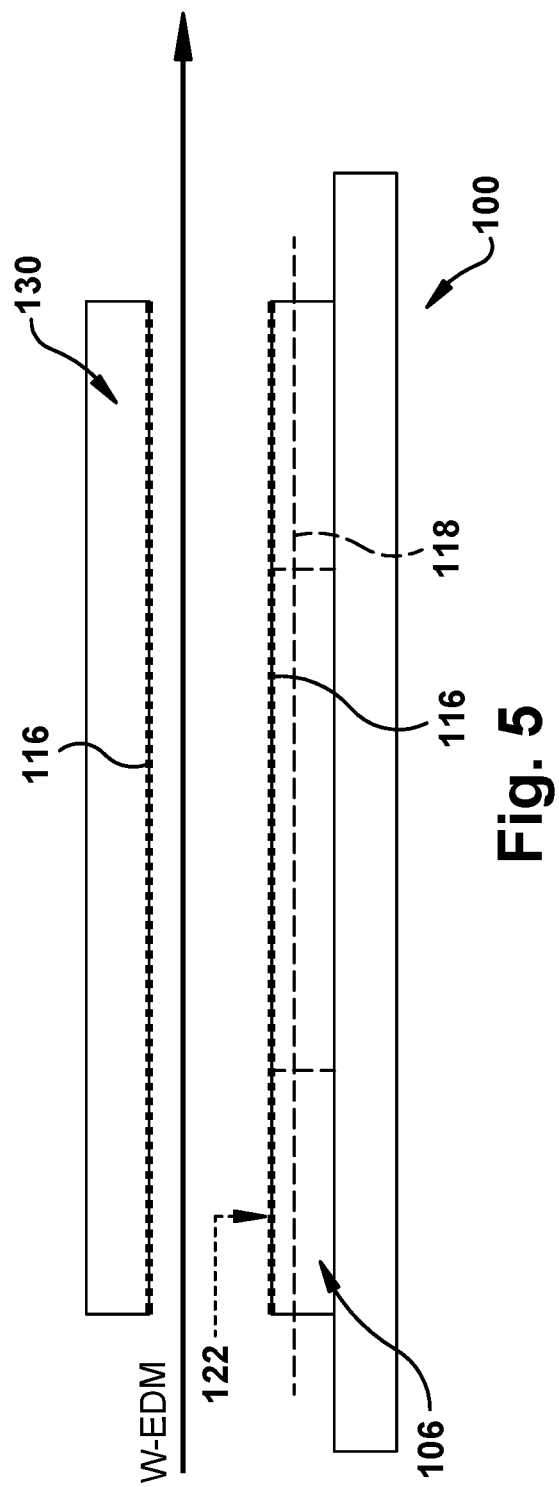
FIG. 5 shows an enlarged side view of a portion of the build plate and illustrative component of FIG. 4 illustrating the removal of illustrative component from the build plate according to embodiments of the disclosure.

FIGS. 4 and 5 show illustrative views of illustrative component 130 removed from build plate 100. Specifically, FIG. 4 shows a perspective view of build plate 100 and at least one illustrative components 130 being removed therefrom, and FIG. 5 shows an enlarged side-view of build plate 100 and one illustrative component 130 being removed therefrom. In one non-limiting example, illustrative component 130 may be removed from build plate 100 at top surface 110 (see, FIG. 1) of reusable supporting platform 106, as indicated and guided by markers 116. In one non-limiting example illustrated by FIG. 5, illustrative component 130 may be removed from build plate 100 at markers 116 adjacent to top surface 110 of reusable supporting platform 106. In another non-limiting example, illustrative component 130 may be removed at alternative location 118. Illustrative component 130 may be removed from build plate 100 at any location within height 114 of reusable supporting platform 106 so long as at least a portion of reusable supporting platform 106 remains after the removal. Once removed, new surface 122 (see, FIG. 4) of reusable supporting platform 106 may be exposed. In the non-limiting example of FIG. 4, new surface 122 may be part of original reusable supporting platform 106. As discussed herein, new surface 122 of reusable supporting platform 106 may be formed and/or may function substantially similar to top surface 110 of reusable supporting platform 106 of build plate 100. Removal of illustrative component 130 may be performed by wire-electrical discharge machining. In other non-limiting examples, illustrative component 130 may be removed by bend saw, grinding, water jetting, laser cutting, Laser MicroJet cutting, and/or any other suitable material removal technique that may remove component 130 and/or a portion of reusable supporting platform 106 from build plate 100

As shown, after removal of illustrative component 130 from build plate 100, at least a portion of reusable supporting platform 106 may remain on base 102 of build plate 100 and may be capable of supporting a second, distinct component to be formed on new surface 122 (see, FIG. 4) by a second, independent additive manufacturing process. In a non-limiting example, new surface 122 may be subjected to additional treatment or preparation after removal of illustrative component 130 and before reusing build plate 100 including reusable supporting platform 106 to support a second additive manufacturing of a second component thereon. For example, new surface 122 may be machined, leveled, planed, heat treated, polished, roughen, and/or the like.

Figure 6:
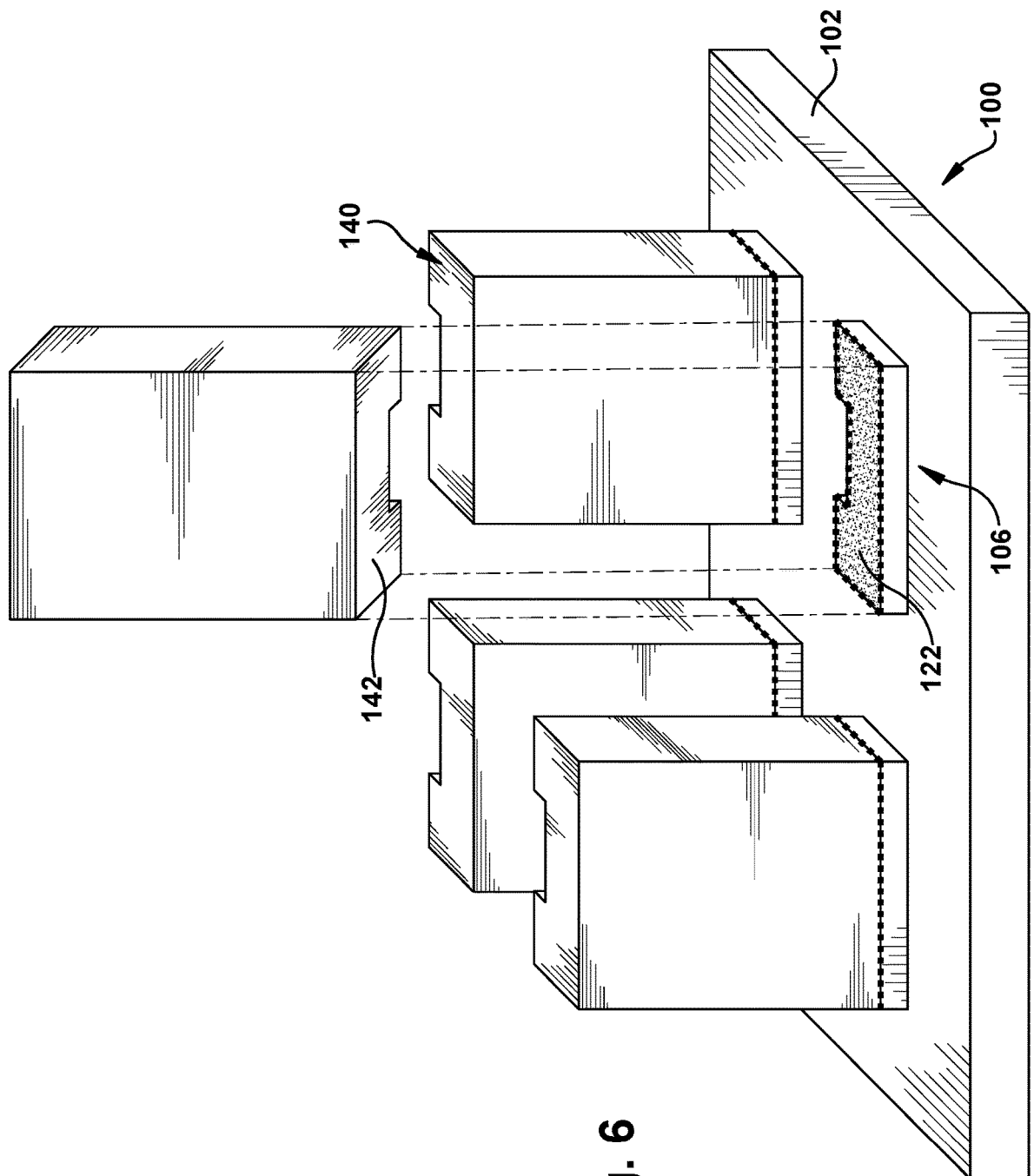
FIG. 6 shows a perspective view of the build plate of FIG. 5, including a second illustrative component manufactured on a new surface of the reusable supporting platform exposed after removal of the initial illustrative component.

FIG. 6 shows build plate 100 including at least one reusable supporting platform 106 with new surface 122 and second illustrative component 140 formed on new surface 122. Specifically, in the non-limiting example, three-second illustrative components 140 are shown formed on new surface 122 of reusable supporting platform 106, and one-second illustrative component 140 is shown exploded away for illustrative purposes. As shown in FIG. 6, second illustrative component 140 includes bottom surface 142. As shown, in a non-limiting example, bottom surface 142 of second illustrative component 140 may be integrally formed on new surface 122 of reusable supporting platform 106 by additive manufacturing. Formation of second illustrative component 150 may for example also include alignment of additive manufacturing bottom surface 142 of second illustrative component 140 with new surface 122 of reusable supporting platform 106.

Second illustrative component 140 may include any component formed by an additive manufacturing process. In the example of FIG. 6, second illustrative component 140 may be substantially similar to illustrative component 130 of FIG. 3. In a non-limiting example, second illustrative component 140 may include a component different from illustrative component 130 of FIG. 3. In the example of FIG. 6, the geometry and size of bottom surface 142 of second illustrative component 130 corresponds to the geometry and size of new surface 122 of reusable supporting platform 106. As discussed herein, bottom surface 142 may include any size approximately equal to or approximately smaller than new surface 122 of reusable supporting platform 106 and any geometry desirable for second illustrative component 140.

Second illustrative component 140 may be formed from any material capable of use in an additive manufacturing process. In one non-limiting example, second illustrative component 140 may be formed from the same material as reusable supporting platform 106 and/or base 102 and/or illustrative component 130 (see, FIG. 3). In another non-limiting example, second illustrative component 140 may be formed from a material different from the material used to form reusable supporting platform 106 and/or base 102 and/or illustrative component 130 (see, FIG. 3). In non-limiting examples, second illustrative component 140 may be formed from metal, metal alloys, and any other material having substantially similar physical properties.

In one non-limiting example, the number of second illustrative components 140 may be dependent on the number of reusable supporting platforms 106. In another non-limiting example, the number of second illustrative components 140 may not be dependent on the number of reusable supporting platforms 106 and can be formed directly on top surface 104 of build plate 100. In another non-limiting example, the number of second illustrative components 140 may not be dependent on the number of reusable supporting platforms 106 and any number of second illustrative component 140 may be formed on a single reusable supporting platform 106.

Figure 7:
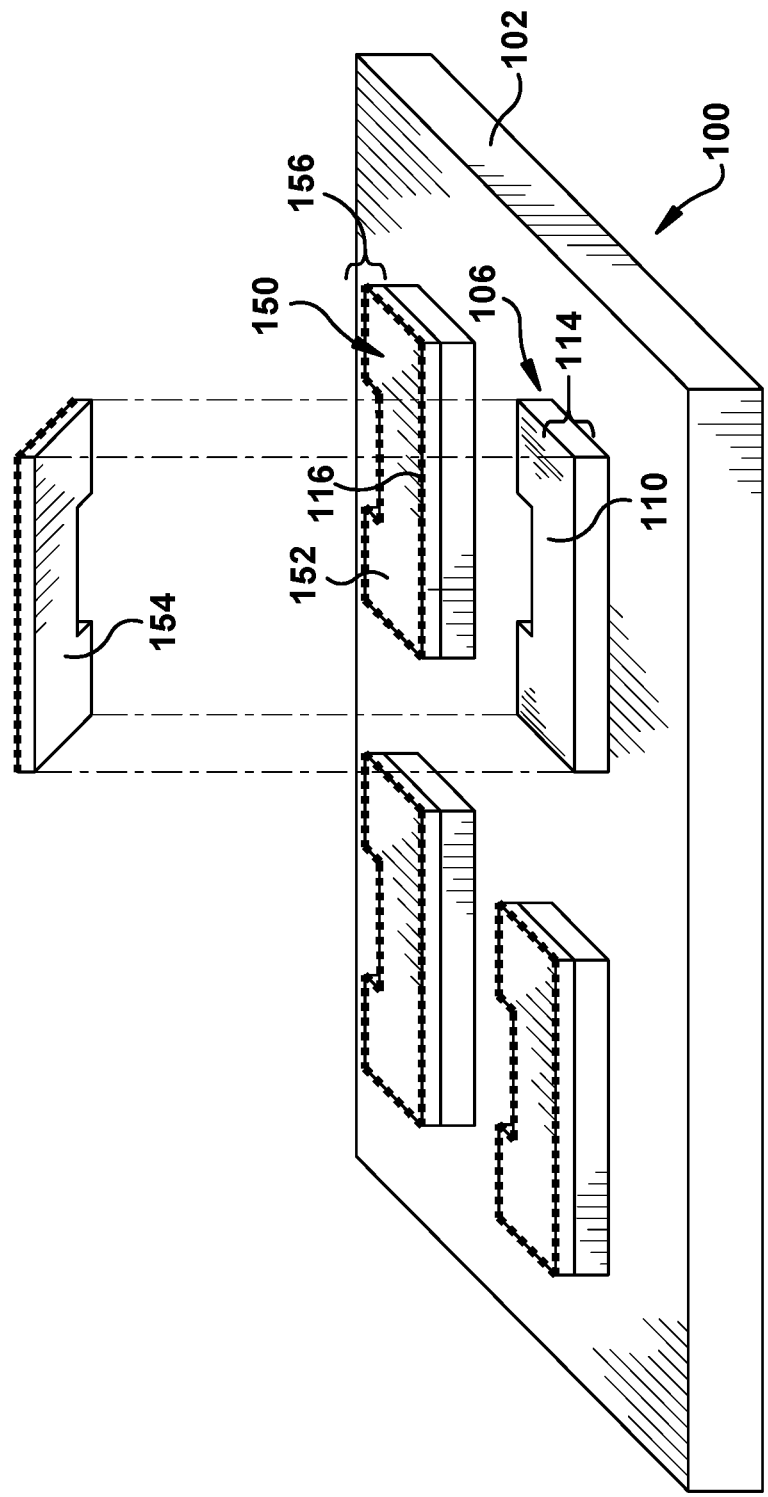
FIG. 7 shows a perspective view of the build plate of FIG. 1, including a sacrificial layer additively manufactured on the reusable supporting platforms of the build plate according to embodiments of the disclosure.
Figure 8:
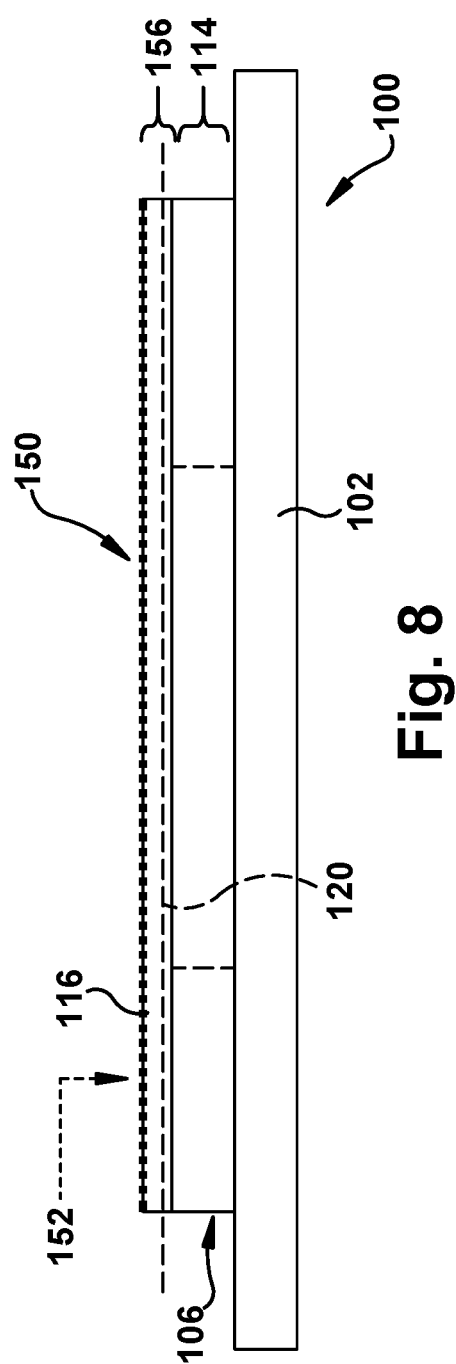
FIG. 8 shows an enlarged side view of a portion of the build plate and sacrificial layer of FIG. 6 illustrating alternative locations for removing the illustrative component from the build plate.

FIGS. 7 and 8 show illustrative views of a non-limiting example of build plate 100 as including at least one optional sacrificial layer 150 formed on top surface 110 of reusable supporting platform 106, according to teachings of the disclosure. Specifically, FIG. 7 shows a perspective view of build plate 100 with at least one reusable supporting platform 106 and at least one sacrificial layer 150 and FIG. 8 shows a side view of build plate 100 with one reusable supporting platform 106 and one sacrificial layer 150 formed on reusable supporting platform 106. Sacrificial layer 150 may be configured to support formation of a component (e.g. component 130, see, FIG. 3). by an additive manufacturing process and further, to be sacrificed during removal of the component from build plate 100 to ensure reusable supporting platform 106 remains capable of supporting formation of a second component by a later second additive manufacturing process. Sacrificial layer 150 includes top surface 152, bottom surface 154 (see, FIG. 7) and height 156. Top surface 152 of sacrificial layer 150 may be exposed to support a component being formed by an additive manufacturing process. Top surface 152 may be vertically opposed to bottom surface 154. Bottom surface 154 may be integrally formed on top surface 110 of reusable supporting platform 106 and/or new surface 122 formed as previously discussed in FIG. 4, by additive manufacturing. In other non-limiting example, bottom surface 154 of sacrificial layer 150, and top surface 110 of reusable supporting platform 106 and/or new surface 122 may be coupled by, sintering, brazing, mechanical fastening, releasable coupling, and/or any other suitable joining or coupling techniques and/or coupling components. Height 156 extends from bottom surface 154 to top surface 152 of sacrificial layer 150. In a non-limiting example, height 156 may be approximately 0.4 millimeters to approximately 5 millimeters. Height 156 may be any height sufficient to ensure reusable supporting platform 106 remains capable of supporting formation of a second component formed by a later additive manufacturing process, after removal of the initial component from build plate 100.

In a non-limiting example, sacrificial layer 150 may also include markers 116, as similarly discussed herein with respect to FIGS. 1 and 2. In the non-limiting example of FIGS. 7 and 8, markers 116 may be adjacent to top surface 152 of sacrificial layer 150. In a second non-limiting example, markers 116 may be positioned at alternative location 120 positioned between top surface 152 and bottom surface 154. In a third non-limiting example, markers 116 may be located anywhere within height 156 of sacrificial layer 150 so long as at least a portion of reusable supporting platform 106 remains after the removal process as discussed herein. In another non-limiting example, markers 116 may be formed on reusable supporting platform 106 as similarly discussed herein with respect to FIGS. 1 and 2. Although illustrated in FIGS. 7 and 8 in a specific quantity surrounding sacrificial layer 150 at top surface 152, markers 116 may be included in any number of gaps, indentations and/or reduced material areas. In a non-limiting example, markers 116 may be formed by additive manufacturing during formation of sacrificial layer 150.

In one non-limiting example where a component (e.g. illustrative component 130 see, FIG. 3) may be removed from build plate 100 at a location within height 156 of sacrificial layer 150, a new surface of sacrificial layer 150 may be exposed, upon which a second distinct component (not shown) may be formed by additive manufacturing. In another non-limiting example where component (e.g. illustrative component 130 see, FIG. 3) may be removed from build plate 100 at a location within height 156 of sacrificial later 150, a new surface of sacrificial layer 150 may be exposed which may be reprocessed to expose top surface 110 of reusable supporting platform 106, upon which a second distinct component (not shown) may be formed by additive manufacturing. In another non-limiting example where a component (e.g. illustrative component 130 see, FIG. 3) may be removed from build plate 100 by entirely removing sacrificial layer 150, top surface 110 of reusable supporting platform 106 may be exposed, upon which a second distinct component (not shown) may be formed by additive manufacturing. In another non-limiting example where a component (e.g. illustrative component 130 see, FIG. 3) may be removed from build plate 100 by entirely removing sacrificial layer 150 and a portion of reusable supporting platform 106, new surface 122 (see, FIG. 6) within height 114 of reusable supporting platform 106 may be exposed, upon which a second distinct component (not shown) may be formed by additive manufacturing.

Sacrificial layer 150 may be formed for example by additive manufacturing. For example, sacrificial layer 150 may be optionally formed on reusable supporting platform 106 before formation of a component by additive manufacturing thereon. In one non-limiting example, sacrificial layer 150 may be formed by a separate additive manufacturing process than reusable supporting platform 106 and/or the component to be formed thereon. Alternatively, formation of sacrificial layer 150 may include for example a same, continuous additive manufacturing process as reusable supporting platform 106 and/or the component to be formed thereon.

In the non-limiting examples of FIGS. 7 and 8, sacrificial layer 106 is illustrated as a solid, u-shape configured to support illustrative component 130 (see, FIG. 3). Sacrificial layer 150 may include any geometry and size for supporting any component formed by additive manufacturing. In a non-limiting example, sacrificial layer 150 may include a geometry and size that corresponds to the geometry and size of reusable supporting platform 106 and the component to be formed thereon. In another non-limiting example, sacrificial layer 150 may include a geometry and/or size that may be different from the geometry and/or size of reusable supporting platform 106 and/or the component to be formed thereon. In a non-limiting example, sacrificial layer 150 may include structures for additional functions, for example, for preventing dislocation of an additive manufactured component from sacrificial layer 150 during formation of the component.

Sacrificial layer 150 may be formed from any material capable of use in an additive manufacturing process and removal of a component formed by additive manufacturing from build plate 100. In one non-limiting example, sacrificial layer 150 may be formed from the same material as base 102 and/or reusable supporting platform 106 and/or the component to be formed thereon. In another non-limiting example, sacrificial layer 150 may be formed from a material different from the material used to form base 102 and/or reusable supporting platform 106 and/or the component to be formed thereon. In non-limiting examples, sacrificial layer 150 may be formed from metal, metal alloys, and any other material having substantially similar physical properties.

Although four sacrificial layers 150 are depicted in FIG. 7, one on each reusable supporting platform 106, it is understood that this number is merely exemplary, and reusable supporting platform 106 may include more or less sacrificial layers 150.

Figure 9:
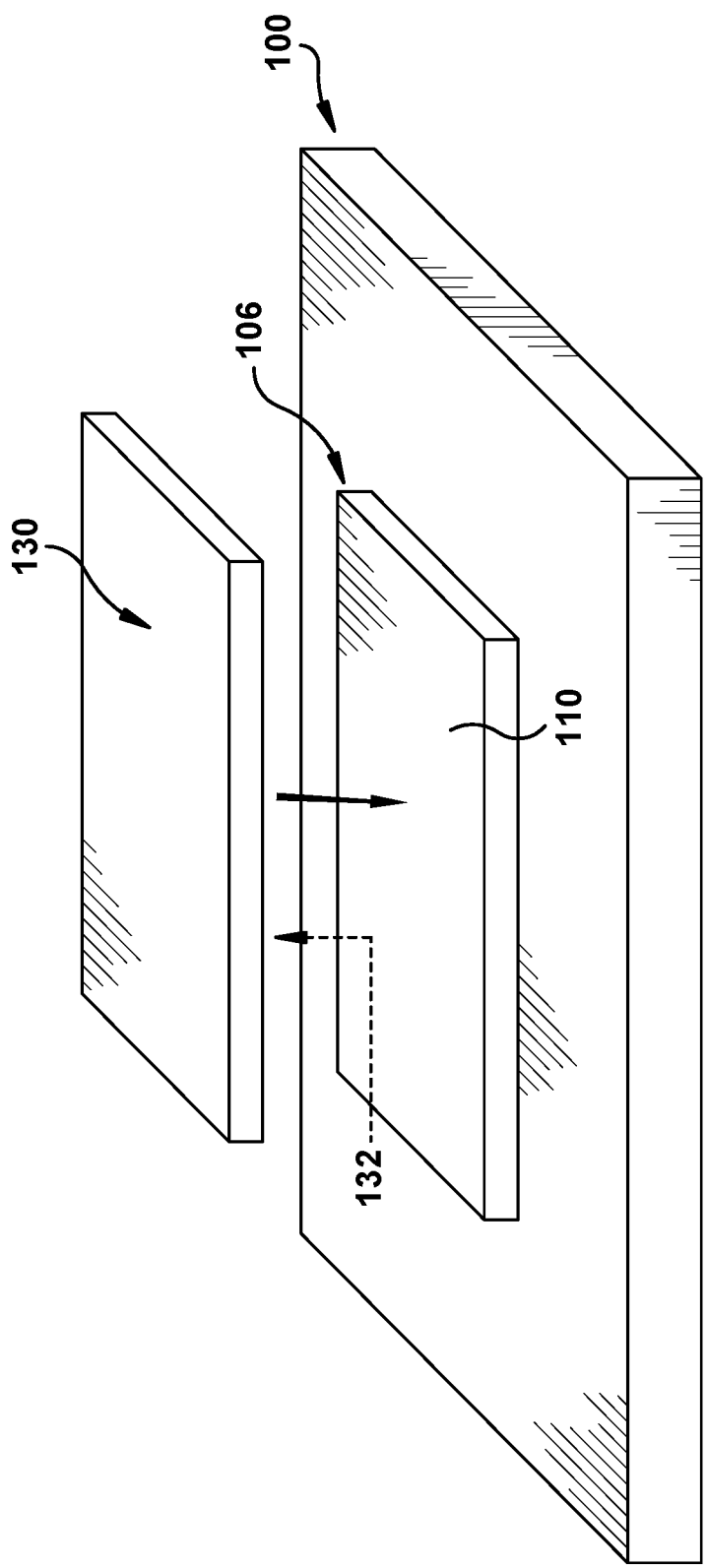
FIGS. 9-11 show an enlarged perspective views of build plates with alternative reusable, illustrating different geometries and sizes of the reusable supporting platform according to embodiments of the disclosure.
Figure 10:
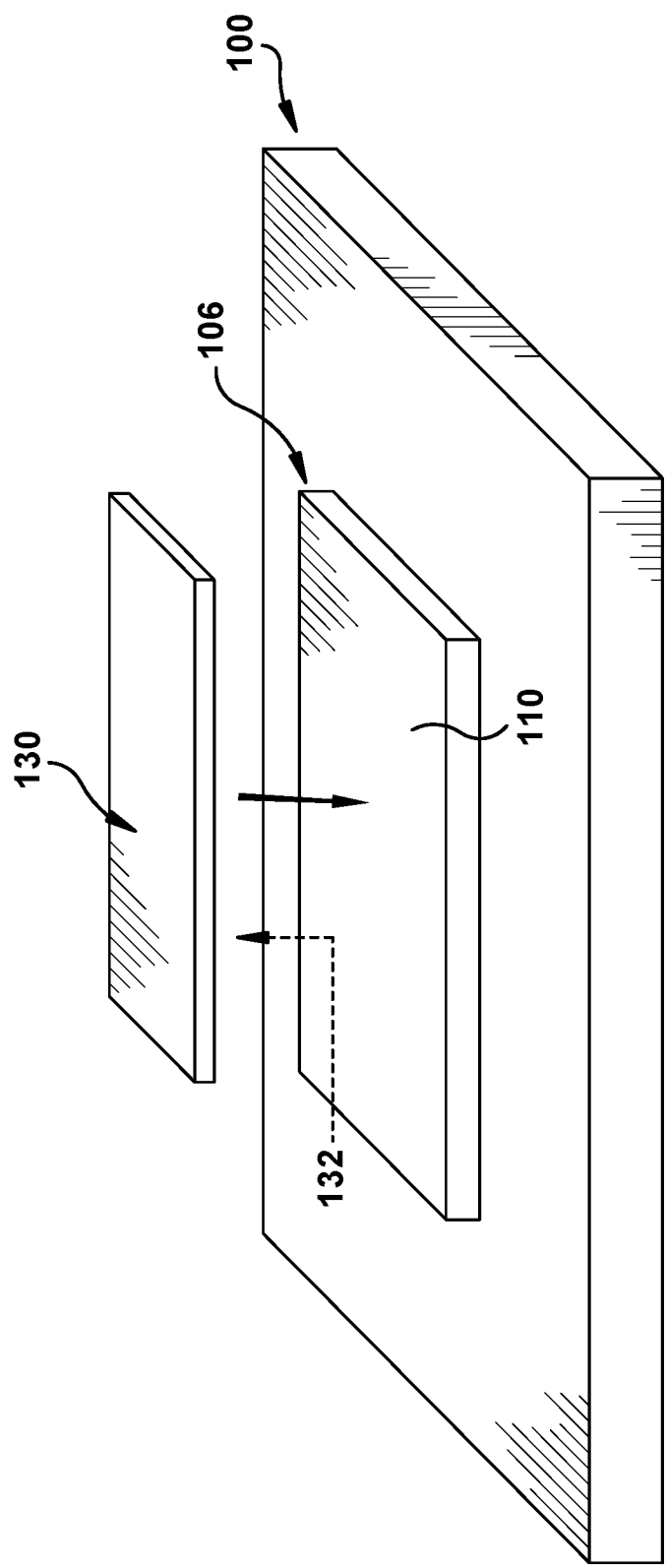
Figure 11:
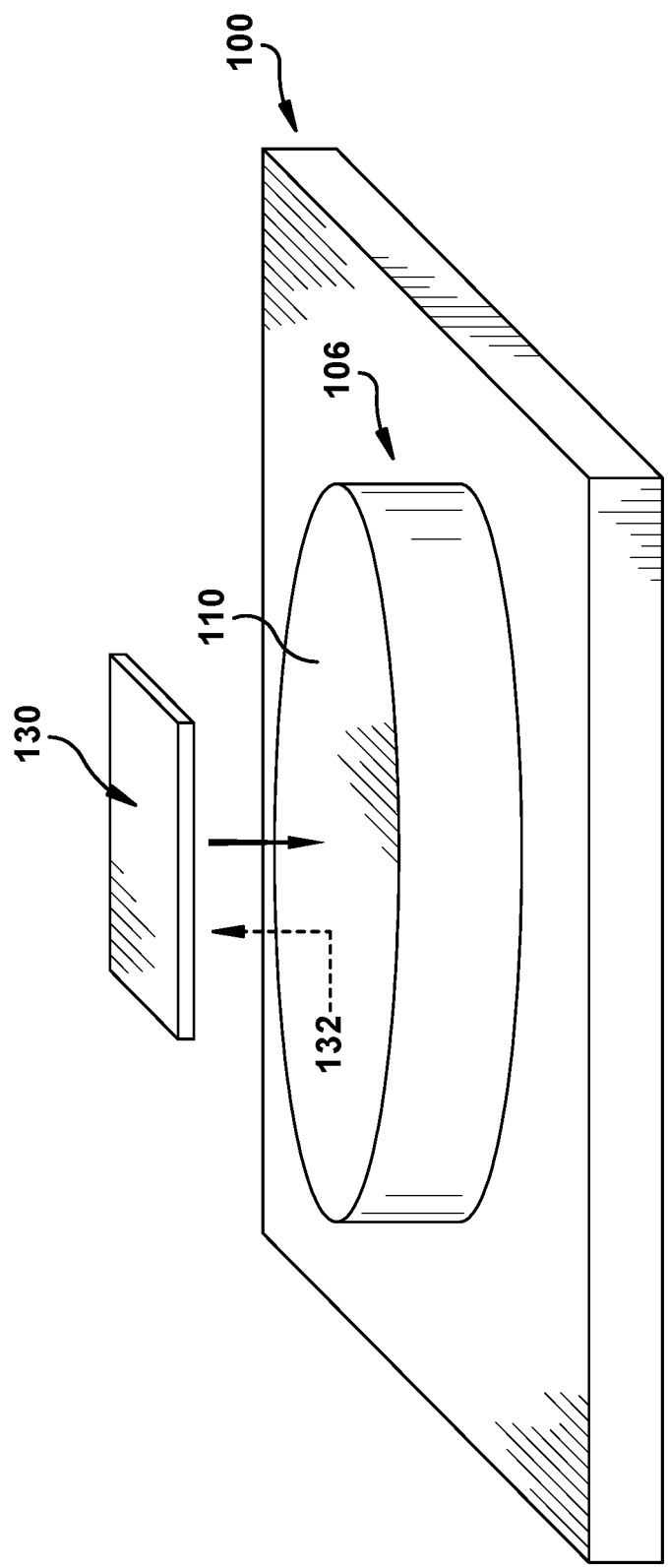

FIGS. 9-11 show perspective views of non-limiting examples of build plate 100 and illustrative component 130 including varying geometries and sizes of reusable supporting platform 106. In the non-limiting example of FIG. 9, reusable supporting platform 106 is illustrated as including a geometry and size that corresponds and may be substantially similar or identical to the geometry and size of bottom surface 132 (see, FIG. 3) of illustrative component 130. In the non-limiting example of FIG. 10, top surface 110 of reusable supporting platform 106 is illustrated as including a geometry that corresponds to the geometry of bottom surface 132 of illustrative component 130, and the size of top surface 110 may be larger than the size of bottom surface 132 of illustrative component 130. In the example of FIG. 11, top surface 110 of reusable supporting platform 106 is illustrated as including a geometry that may be different from the geometry of bottom surface 132 of illustrative component 130, and the size of top surface 110 may be larger than the size of bottom surface 132 of illustrative component 130. In other non-limiting examples, bottom surface 112 (see, FIG. 1) of reusable supporting platform 106 may for example include a size that may be larger than and/or a geometry that may be different from top surface 110 of reusable supporting platform 106 and/or bottom surface 132 of illustrative component 130.

Figure 12:
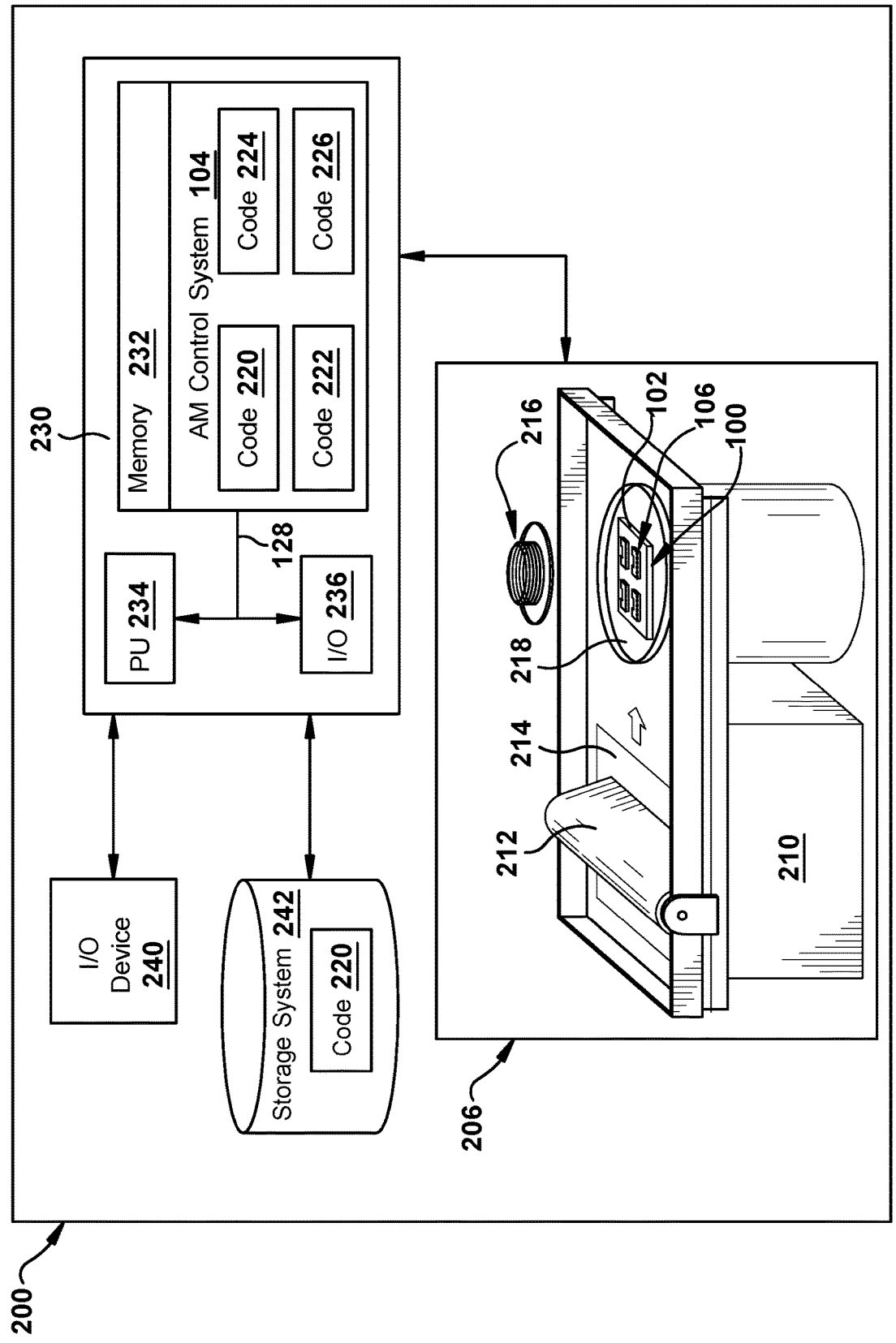
FIG. 12 shows a block diagram of an additive manufacturing process including a non-transitory computer readable storage medium storing code representative of a reusable supporting platform according to embodiments of the disclosure.

FIG. 12 shows a schematic/block view of an illustrative computerized additive manufacturing system 200 for generating a reusable supporting platform 106 on a base 102 of build plate 100 and/or illustrative component 130 (see, FIG. 3) on reusable supporting platform 106. In this example, system 200 is arranged for direct metal laser melting (DMLM), a metal powder additive manufacturing process. It is understood that the general teachings of the disclosure are equally applicable to other forms of additive manufacturing. Reusable supporting platform 106 is illustrated as a support element for illustrative component 130 (see, FIG. 4); however, it is understood that the additive manufacturing process can be readily adapted to manufacture any reusable support for any component. AM system 200 generally includes a computerized additive manufacturing (AM) control system 204 and an AM printer 206. AM system 200, as will be described, executes code 220 that includes a set of computer-executable instructions defining reusable supporting platform 106 to physically generate the reusable using AM printer 206. Each AM process may use different raw materials in the form of, for example, fine-grain metal powder, a stock of which may be held in a chamber 210 of AM printer 206. In the instant case, reusable supporting platform 106 may be made of metal or a metal alloy. As illustrated, an applicator 212 may create a thin layer of raw material 214 spread out as the blank canvas from which each successive slice of the final component or reusable supporting platform will be created. In the example shown, a laser or electron beam 216 fuses particles for each slice, as defined by code 220. Various parts of AM printer 206 may move to accommodate the addition of each new layer, e.g., a build platform 218 may lower and/or chamber 210 and/or applicator 212 may rise after each layer. In this example, base 102 is distinct from build platform 218. It is understood that base 102 is not limited to the example of FIG. 1, build platform 218 may in one example act as base 102 for building reusable supporting platform 106.

AM control system 204 is shown implemented on computer 230 as computer program code. To this extent, computer 230 is shown including a memory 232, a processor 234, an input/output (I/O) interface 236, and a bus 238. Further, computer 230 is shown in communication with an external I/O device/resource 240 and a storage system 242. In general, processor 234 executes computer program code, such as AM control system 204, that may be stored in memory 232 and/or storage system 242 under instructions from code 220 representative of reusable supporting platform 106 and/or illustrative component 130 (see, FIG. 3). While executing computer program code, processor 234 can read and/or write data to/from memory 232, storage system 242, I/O device 240 and/or AM printer 206. Bus 238 provides a communication link between each of the components in computer 230, and I/O device 240 can comprise any device that enables a user to interact with computer 240 (e.g., keyboard, pointing device, display, etc.). Computer 230 is only representative of various possible combinations of hardware and software. For example, processor 234 may comprise a single processing unit, or be distributed across one or more processing units in one or more locations, e.g., on a client and server. Similarly, memory 232 and/or storage system 242 may reside at one or more physical locations. Memory 232 and/or storage system 242 can comprise any combination of various types of non-transitory computer readable storage medium including magnetic media, optical media, random access memory (RAM), read only memory (ROM), etc. Computer 230 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 232, storage system 242, etc.) storing code 220 representative of reusable supporting platform 106. As noted, code 220 includes a set of computer-executable instructions defining reusable supporting platform 106 that can be used to physically generate the reusable supporting platform, upon execution of the code by system 200. For example, code 220 may include a precisely defined 3D model of reusable supporting platform 106 and/or illustrative component 130 (see, FIG. 3) and can be generated from any of a large variety of well-known computer aided design (CAD) software systems such as AutoCAD®, TurboCAD®, DesignCAD 3D Max, etc. In this regard, code 220 can take any now known or later developed file format. For example, code 220 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional component to be fabricated on any AM printer. Code 220 may be translated between different formats, converted into a set of data signals and transmitted, received as a set of data signals and converted to code, stored, etc., as necessary. Code 220 may be an input to system 200 and may come from a part designer, an intellectual property (IP) provider, a design company, the operator or owner of system 200, or from other sources. In any event, AM control system 204 executes code 220, dividing reusable supporting platform 106 into a series of thin slices that it assembles using AM printer 206 in successive layers of powder. In the DMLM example, each layer may be melted or sintered to the exact geometry defined by code 220 and fused to the preceding layer. Subsequently, reusable supporting platform 106 may be exposed to any variety of finishing processes, e.g., minor machining, sealing, polishing, assembly to another part, etc.

It is understood that AM system 200 may execute alternative or additional code in the same manner described above. For example, AM system 200 may also execute, in addition to code 220, code 222 that includes a set of computer-executable instructions defining illustrative component 130 (see, FIG. 3) to physically generate the component using AM printer 206. AM system 200 may also execute, further additional code 224 that includes a set of computer-executable instructions defining sacrificial layer 150 (see, FIG. 7) to physically generate the component using AM printer 206. Alternatively, system 200 may execute code 226 that includes a set of computer-executable instructions defining reusable supporting platform 106 and illustrative component 130 (see, FIG. 3) and/or sacrificial layer 150 (see, FIG. 7) to physically generate both the reusable supporting platform and the component and/or the sacrificial layer using AM printer 206 in one continuous metal powder additive manufacturing process. It is also understood that the additional or alternative code is not limited to instructions for manufacture of illustrative component 130 (see, FIG. 3) and/or sacrificial layer 150 (see, FIG. 7), and may include instructions for any desirable AM structure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstances may or may not occur and that the description includes instances where the event occurs and instances where it does not. Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

As additional matter, in order to clearly describe the current disclosure it may be necessary to select certain terminology when referring to and describing a component manufactured as described herein. When doing this, if possible, common industry terminology may be used and employed in a manner consistent with its accepted meaning. For example, a "metallic component" as used herein may include any material object including a metal or metal alloy formed by a metal power additive manufacturing process and a "component" can include any material object formed by additive manufacturing processes, perhaps using materials other than metal such as but not limited to polymers and ceramic composites. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

What is claimed is:

1. A method for using a reusable supporting platform for additive manufacturing, the method comprising:
    additive manufacturing the reusable supporting platform on a top surface of a build plate, the reusable supporting platform including:
        a body including a first surface coupled to the top surface of the build plate, and a second surface configured to support a component to be formed by additive manufacturing and for separation of the component from the build plate, and
        a set of markers configured for guiding the separation of the component from the build plate;
    additive manufacturing a first component on the second surface of the reusable supporting platform;
    separating the first component and a portion of the body of the reusable supporting platform from the build plate at a selected location between the first and second surfaces such that at most a first portion of the reusable supporting platform is removed, thereby exposing a new surface of the body of the reusable supporting platform at the selected location, wherein a remaining second portion of the reusable supporting platform is configured to support a second component to be formed by additive manufacturing and for separation of the additional component from the build plate; and
    additive manufacturing the second component on the new surface of the reusable supporting platform.

2. The method of claim 1, wherein the additive manufacturing the first component includes visually aligning a bottom surface of the first component with the second surface of the reusable supporting platform.

3. The method of claim 1, wherein the additive manufacturing the second component includes visually aligning a bottom surface of the second component with the new surface of the reusable supporting platform.

4. The method of claim 1, further comprising separating the second component from the build plate at the new surface of the reusable supporting platform.

5. The method of claim 1, further comprising leveling the new surface of the reusable supporting platform before the additive manufacturing the second component.

6. The method of claim 1, wherein the separating the first component from the build plate includes wire-electrical discharge machining.

7. The method of claim 1, wherein the additive manufacturing the reusable supporting platform and the additive manufacturing the first component include additive manufacturing the reusable supporting platform and the first component during a same first continuous additive manufacturing process, wherein the reusable supporting platform, the build plate, and the first component are formed of a same material composition.

8. The method of claim 7, wherein the additive manufacturing the second component includes additive manufacturing a support layer on the new surface followed by additive manufacturing of a bottom surface of the second component during a same second continuous additive manufacturing process, distinct from the first continuous additive manufacturing process, the support layer configured to support the second component being formed by additive manufacturing and for separation of the second component from the build plate.

9. The method of claim 1, wherein the separating the first component from the build plate at the second surface of the reusable supporting platform includes guiding removal of the first component from the reusable supporting platform by the set of markers.

10. The method of claim 1, wherein the set of markers are located along a border of the second surface of the body of the reusable supporting platform.

11. The method of claim 1, wherein the set of markers are located between the first surface and the second surface.

12. The method of claim 1, wherein the set of markers include a gap, an indentation, or a reduced material area to aid the separation of the component from the build plate.

13. The method of claim 1, wherein the set of markers are formed by additive manufacturing during formation of the reusable supporting platform.

14. A method for using a reusable supporting platform for additive manufacturing, the method comprising:
    additive manufacturing the reusable supporting platform on a top surface of a build plate, the reusable supporting platform including:
        a body including a first surface coupled to the top surface of the build plate and a second surface configured to support a component to be formed by additive manufacturing, wherein a geometry of the first surface is different from a geometry of the second surface, and
        a set of markers configured for guiding the separation of the component from the build plate at a selected location between the first and second surfaces of the body of the reusable supporting platform;
    additive manufacturing a first component on the second surface of the reusable supporting platform;
    separating the first component and a portion of the body of the reusable supporting platform from the build plate at the selected location of set of markers of the reusable supporting platform such that at most a first portion of the reusable supporting platform is removed, thereby exposing a new surface of the body of the reusable supporting platform at the selected location, wherein a remaining second portion of the reusable supporting platform is configured to support a second component to be formed by additive manufacturing and for separation of the second component from the build plate; and
    additive manufacturing the second component on the new surface of the reusable supporting platform.

15. The method of claim 14, wherein the additive manufacturing the first component includes visually aligning a bottom surface of the first component with the second surface of the reusable supporting platform.

16. The method of claim 14, wherein the additive manufacturing the second component includes visually aligning a bottom surface of the second component with the new surface of the reusable supporting platform.

17. The method of claim 14, further comprising leveling the new surface of the reusable supporting platform before the additive manufacturing of the second component.

18. The method of claim 14, wherein the set of markers include a gap, an indentation, or a reduced material area to aid the separation of the component from the build plate.

19. The method of claim 14, wherein the set of markers are located between the first surface and the second surface.

20. A method for using a reusable supporting platform for additive manufacturing, the method comprising:
    additive manufacturing the reusable supporting platform on a top surface of a build plate, the reusable supporting platform including:

a body including a first surface coupled to the top surface of the build plate and a second surface configured to support a component to be formed by additive manufacturing, wherein a height of the body extends from the first surface to the second surface, and wherein the first surface is larger than the second surface;

additive manufacturing a first component on the second surface of the reusable supporting platform;

separating the first component and a portion of the body of the reusable supporting platform from the build plate at a location within the height of the body of the reusable supporting platform between the first and second surfaces such that at most a first portion of the reusable supporting platform is removed, thereby exposing a new surface of the body of the reusable supporting platform at the selected location, wherein a remaining second portion of the reusable supporting platform is configured to support a second component to be formed by additive manufacturing and for separation of the second component from the build plate; and additive manufacturing the second component on the new surface of the reusable supporting platform.

* * * * *